United States Patent

Egalon et al.

[15] 3,644,216
[45] Feb. 22, 1972

[54] CATALYSTS

[72] Inventors: Roger Egalon; Ramiro Tella, both of Saint Andre, Nord, France

[73] Assignee: Societe Anonyme: Ugine Kuhlmann, Paris, France

[22] Filed: Aug. 19, 1969

[21] Appl. No.: 851,434

Related U.S. Application Data

[63] Continuation-in-part of Ser. No. 705,862, Feb. 15, 1968, abandoned, Continuation-in-part of Ser. No. 386,481, July 22, 1964, abandoned.

[30] Foreign Application Priority Data

July 24, 1963 France .................................942493

[52] U.S. Cl. ..........................252/455 R, 252/466, 252/472, 252/474
[51] Int. Cl. .........................................................B01j 11/40
[58] Field of Search ........................252/466, 474, 455, 472; 23/198; 75/44; 264/111

[56] References Cited

UNITED STATES PATENTS

| | | | |
|---|---|---|---|
| 1,698,300 | 1/1929 | Ehlers | 264/111 |
| 1,489,497 | 4/1924 | Carson | 252/466 |
| 1,618,004 | 2/1927 | Greathouse | 252/472 |
| 3,243,386 | 3/1966 | Nielsen | 252/455 |
| 3,417,031 | 12/1968 | Hinrichs | 252/472 |
| 1,853,771 | 4/1932 | Larson | 252/477 X |

*Primary Examiner*—Daniel E. Wyman
*Assistant Examiner*—Philip M. French
*Attorney*—Hammond & Littell

[57] ABSTRACT

This invention relates to a method of preparing iron-promoted catalysts in a pelletized form for the synthesis of ammonia which comprises the steps of fusing a mixture consisting essentially of iron oxides of the approximate composition of magnetite together with additional oxides of promoter metals in a total proportion of the oxides of promoter metals of from about 1 percent to about 10 percent, rapidly cooling the fusion product, grinding the fusion product to give fine, regular granules, reducing substantially completely the fused granules, coarsely grinding the reduced fused granules, agglomerating the coarsely ground product into pellets by simple compression and recovering said catalyst in a pelletized form. The invention also relates to the catalysts so produced.

7 Claims, No Drawings

CATALYSTS

CROSS-REFERENCE TO OTHER APPLICATIONS

This application is a continuation-in-part of our copending application Ser. No. 705,862, filed Feb. 15, 1968, now abandoned, which in turn was a "streamlined" continuation application of Ser. No. 386,481, filed July 22, 1964, now abandoned.

THE PRIOR ART

It is known that the catalytically active principle for the synthesis of ammonia is microcrystalline iron. The only practical way of obtaining said catalytically reactive iron is that which consists in starting from $Fe_3O_4$ (magnetite), and in reducing said oxide to $\alpha$-iron. Preferably the $Fe_3O_4$ (magnetite) prior to reduction contains in solid solution small quantities of refractory oxides known as "promoters," such as $Al_2O_3$, CaO, $K_2O$, etc. These oxides promote the formation of $\alpha$-iron microcrystals and electronically enhance the catalytic properties of the surface of the iron crystals. In the course of this reduction, which is generally carried out by means of hydrogen or synthesis gas comprising essentially a mixture of suitable proportions of nitrogen and hydrogen, the release of oxygen atoms in the form of water vapor forms a fine network of micropores inside the mass in contact with the heated reduction phase. It has been shown that promoters such as alumina, CaO, MgO, $SiO_2$, etc., maintain this microporous texture while avoiding thermal fritting of the iron microcrystals formed and their recrystallization into large crystals, whereas this recrystallization is promoted by the water vapor formed during the reduction. The electronically active promoters are such oxides as $K_2O$, $Cs_2O$, etc.

In order to obviate this undesirable action of the water vapor, it is necessary to operate under conditions such that the gaseous flow sweeps at a high space velocity over all points of the catalytic surface being formed, in order not to allow the water vapor resulting from the reduction to stagnate locally. In order to carry out the reduction satisfactorily, it is therefore necessary for the crude catalyst to be previously subdivided into granules of regular geometrical shape, having good mechanical strength and a homogeneous physicochemical texture, while allowing them to retain great reducibility at the lowest possible temperature.

It is also known that the fusion product of magnetite and promoter oxides undergoes segregation after pouring, due to migration in connection with the different rates of cooling of its molten constituents. Moreover, the grinding and subsequent screening of the cooled mass leads to solid particles or fragments of various geometrical shapes and of heterogeneous sizes. In order to impart to these fragments an adequate mechanical strength after reduction, it is necessary to add to the magnetite before fusion substantial proportions of lime and alumina, which further increases the above-mentioned disadvantages, namely, segregation on cooling, a heterogeneous texture of the crude fragments, and the difficulty of reducing them in a satisfactory manner.

Numerous attempts have been made to obviate these disadvantages in catalysts based on an $\alpha$-iron utilized up to the present time in the synthesis of ammonia.

According to the prior practice a dispersion as homogeneous as possible of the promoter additives in the magnetite was aimed at. This was obtained by incorporating the additives in the molten magnetite and by rapidly cooling the mixture to limit the unfavorable phenomena of migration of the additives and thus the heterogeneity of the activated magnetite or "raw catalyst." The raw catalyst was then broken into small pieces of irregular shape, which were sieved to obtain batches having a varying, but not too widely spread, particle size.

Starting from this stage, two ways were followed to obtain the active catalyst.

The more generally used was the reduction in situ of the raw catalyst, i.e., the reduction thereof in the synthesis reactor tubes. Numerous studies and publications have been made about the conditions of such a reduction. All recommend a relatively low reduction speed at a temperature of the order of 500° C. These conditions, which lead to high expenses, result from the fact that the reduction of magnetite to iron is accompanied by two major facts:
—the change of crystalline system
—the emission of water.

Magnetite crystallizes in the cubic system, whereas $\alpha$-iron crystallizes in the face-centered cubic system. It luckily happens that the dimensions of the respective crystalline system are very close to one another. There is thus no variation in volume.

However, a complete crystalline reorganization takes place once the oxygen has been displaced. The disappearance of oxygen leads to a 27 percent reduction of weight and therefore of the specific gravity of the catalyst.

The reduction of the catalyst gives the reaction:

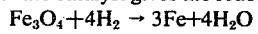
$$Fe_3O_4 + 4H_2 \rightarrow 3Fe + 4H_2O$$

It is well known that when the water which is formed remains in contact with the catalyst during reduction it affects the formation of $\alpha$-iron microcrystals and thus diminishes the reactivity of the final catalyst.

The practical consequences of these two phenomena are that, on the one hand, the reduction process should be carried out very slowly so as to sweep off the water as it forms, said water passing through the downstream catalyst bed, and on the other hand, the crystalline modification is accompanied by a structural weakening, and, therefore, by a partial loss of mechanical properties, and by the formation of catalyst dust which must be eliminated as soon as possible to avoid abrasion of the circulation pumps of the synthesis circuit.

In order to avoid such drawbacks, it has appeared as logical to take a second way, that is, the prereduction of the catalyst in conditions which are as closely controlled as possible. The reactivity of the catalyst can thereby be improved, and the formation of dust in the operating circuit is lessened. On the other hand, this second method has two inconveniences with respect to the first. First, a surface reoxidation must be carried out at the end of the reduction in order that the catalyst may be stored and manipulated in air (antipyrophoric treatment). Second, from the psychological point of view, the prereduction entails an increase of the selling price of the catalyst, whereas the actual cost of the reduction in situ is often drowned in the general costs of the synthesis plant.

Finally, the two above-described ways, (1) reduction in situ and (2) prereduction, lead to the same type of catalyst, a basically $\alpha$-iron activated catalyst in the form of small pieces of irregular shape and low mechanical resistance.

A third process is also known for the improvement of these catalysts. This involves finely crushing the crude fused oxides, pelletizing them in the oxidic state, generally in the presence of a binder or a lubricant, in order to confer a certain amount of cohesion to the powder and thereafter, by metalloceramic techniques, subjecting the material to a fritting at high temperatures to improve the mechanical stability of the oxidic catalyst. Thereafter the fritted material is fragmented and reduced, either in situ or as a separate step. Unfortunately, the granules obtained from this crude powder do not acquire sufficient physical strength unless a binder or a flux is previously added to the crude ground powder, or unless the fragile crude granules are brought to a sintering temperature which is dangerously close to the melting temperature.

Apart from the cost of such a pelletizing, due to the hardness of the starting material, the sintering steps by superficially melting the magnetite leads away from the obtention of a crystalline material with an area as great as possible. Finally and mainly, the subsequent reduction of the pelletized catalyst has exactly the same inconveniences as the conventional reductions. Only the mechanical conditions of shape and resistance are, therefore, improved, at the price of a costly treatment and of a loss of reactivity.

OBJECTS OF THE INVENTION

An object of the present invention is the obtention of a highly reactive catalyst which has good mechanical strength, is prereduced, and is in the form of pellets.

Another object of the invention is the development of a method of preparing iron-promoted catalysts in a pelletized form for the synthesis of ammonia which comprises the consecutive steps of (1) fusing a mixture consisting essentially of iron oxides of the approximate composition of magnetite, together with additional oxides of promoter metals in a total proportion of the oxides of promoter metals of from about 1 percent to about 10 percent, (2) rapidly cooling the fusion product, (3) grinding the fusion product to obtain fine regular granules, (4) reducing substantially completely the fused granules, (5) agglomerating the coarsely ground reduced product into pellets by simple compression, and (6) recovering said iron-promoted reduced catalyst in a pelletized form.

These and other objects of the present invention will become more apparent as the description thereof proceeds.

DESCRIPTION OF THE INVENTION

For the purpose of achieving the pelleted catalyst according to the invention which has a basis of activated, reduced iron and is intended for the synthesis of ammonia, a crude catalyst is first prepared by the known method by melting a mixture of iron oxides of the approximate composition of magnetite, $Fe_3O_4$, together with small amounts of oxides of promoter metals, as conventionally used. These amounts in total vary from about 1 percent to about 10 percent of the mixture of oxides. Preferably $Al_2O_3$ is present as one of the oxides of promoter metals due to its refractory properties. The $Al_2O_3$ should be present in an amount of from 0.5 to 9.0 percent, preferably from 1.0 to 2.5 percent, of the total weight of the mixture of oxides. In addition, it is also preferable to include $K_2O$ as one of the oxides of the promoter metals due to its electronic promotive activity. The $K_2O$ should be present in an amount of from 0.075 to 2 percent, preferably from 0.1 to 0.5 percent, of the total weight of the mixture of oxides. Other oxides of promoter metals, such as $SiO_2$, alkali metals and earth alkali metals oxides, etc., may also be included in the mixture of oxides to be fused. In this respect, lithium oxide corresponding to from 0.1 to 0.5 percent of $Li_2O$ may be added. However, the presence of these other oxides are not necessary to the practice of the invention.

The fused mixture of oxides is then rapidly cooled to limit the unfavorable phenomena of additive migration as is conventional. Preferably the fused mixture is poured in a thin layer on a moving cooled mold. The cooled mass is then ground into fine, regular granules or fragments of from about 2 to 10 mm. The resulting fragments are subjected to reduction, preferably a practically complete reduction, in view of the subsequent pelletizing. Preferably the reduction is conducted with small volumes of the fragments as compared with the large volumes of catalysts previously reduced in commercial synthesis tubes. This reduction can be made in thin layers of the fragments utilizing a gas containing hydrogen as the reducing agent. Preferably it is advisable to utilize a synthesis gas having a ratio of $3H_2$ to $N_2$. The temperature of the reduction may be between ambient temperature and 550° C., preferably around 500° C., at ordinary or slightly elevated pressure. The increase in temperature programming of the reduction together with the throughput of the reducing gases should be selected in order that the water content of the exit gases preferably, but not limitingly, not exceed 1 percent, preferably 0.25 percent. The reduction should be continued until no further water vapor is found in the exit gases at temperatures of over 500° C.

A friable reduced product is obtained by the reduction. The product is then ground coarsely to give a microcrystalline α-iron powder, preferably passing through a 2-mm. mesh or finer sieve. It is also possible to reduce the granules in a fluidized bed. In this case, it is preferable to grind the cooled fused mass to fine, regular granules of less than 2 mm. When reducing these granules in a fluidized bed, the water content of the exit gases is not as critical. The same type of reduced microcrystalline α-iron powder is obtained. The reduced, microcrystalline powder is then formed into pellets, even without addition of adjuvants. The pelleting at this point takes advantage of the malleability of the α-iron content of the reduced powder. The pressures required for the necessary compression of the pellets varies according to the type of pelletizing presses, size of the pellets and the quality of the reduced microcrystalline powder. Pressures in the order of 1,000 to 10,000 kg./cm.$^2$ may be employed. Higher pressures may be employed but the resulting pellets have a somewhat lower catalytic effectiveness.

It has been found that by subjecting the granules of crude catalyst obtained as described above to a high degree of reduction, and under the special conditions which have just been mentioned, extremely friable reduced catalyst granules are obtained which by coarse grinding yield a microcrystalline powder capable of being agglomerated into pellets possessing good mechanical strength by simple compression, without the addition of a binder, flux, or any solid or liquid adjuvant, these pellets constituting the advantageous form of the catalyst according to the invention.

It was also found that even if the rate of compression of the above-mentioned microcrystalline powder varies within wide limits, for example, from 1 to 15 tons per square cm., the microporosity of the resulting pellets remains constant and very high, as is proved by specific surface measurements.

In addition, the macroporosity of the resulting pellets is likewise high and can be controlled, because it is inversely proportional to the rate of compression applied within the limits indicated above.

It was totally unexpected to find that the compression of the reduced microcrystalline powder into pellets did not destroy the crystalline structure of the α-iron crystals, and more particularly, the micropores which are the seat of the catalytic phenomena.

It, therefore, becomes perfectly possible to manufacture pellets of prereduced catalyst having an excellent macro- and microporosity. This operation leads to a very important increase of specific gravity of the catalyst without the catalyst showing a substantial loss of reactivity.

The pelletizing step can be operated in air with a reduced microcrystalline powder previously submitted to an antipyrophoric treatment, although the grinding and pelletizing of the prereduced fragments can be conducted in an inert atmosphere. This is very important since it could be expected that the superficial formation of magnetite with the antipyrophoric treatment would interfere with the further operations of crushing and pelletizing. The antipyrophoric treatment can be conducted at about room temperature with a reducing gas containing from 0.05 to 0.1 percent of air or proportionately lesser amounts of oxygen.

It is, therefore, possible by the present invention to obtain the optimal composition of the catalyst with respect to its electronically promoting oxides without regard to any possible loss of mechanical properties which might occur on reduction.

The pellets of catalyst obtained by the process of the invention are mechanically stable even when low amounts of refractory oxides such as $Al_2O_3$, CaO and $SiO_2$ are utilized. The catalyst pellets are preferably employed as such and directly charged into the reactor tubes for ammonia synthesis. However, they may be crushed and sized if smaller catalyst fragments are desired. Tests have proven that in either event the amount of dust production from the catalysts by erosion of the gases passing through the synthesis reactors is practically nil.

Where catalysts are involved, the interest of the invention lies in the technical performances achieved thereby.

a. The catalyst of the invention has an apparent specific gravity at least 15 percent higher than that of any of the iron-based catalysts known hitherto. This comparison is, of course, based on the active form of the catalyst, i.e., after reduction.

This increase of the specific gravity makes it possible to charge, in a given conventional reactor, 15 percent more catalyst, or conversely to reduce by 15 percent the volume of a new reactor. This fact is very important at a time when the size of the reactors steadily increases.

b. The catalyst of the invention in the form of regular-sized pellets makes it possible to decrease very substantially the loss of pressure of the synthesis fluid flow during its passage through the catalyst bed. Furthermore, the preferential passages through the bed are considerably reduced.

c. In spite of the pelletizing, and due to the fact that micrograins are agglomerated, the catalyst of the invention has a macroporosity which is five times greater than the prior art catalyst in broken pieces or fragments, thereby substantially increasing the accessibility to the active sites.

d. The mechanical strength of the catalyst of the invention is considerably increased. In practice, and contrary to what happens with prior art catalysts in broken pieces or fragments, the loss of pressure through the catalyst bed does not increase with time and there is no formation of dust.

e. Due to the possibility of achieving the optimum composition of the catalyst, reactivity levels have been reached which could not be obtained heretofore. For example, the conversion rate is 22.1 percent at 460° C. under a pressure of 250 bars with a space velocity of 25,000.

As indicated, after their reduction and cooling, the granules may advantageously be treated in known manner by the gas or gaseous mixture previously used for the reduction but charged with a small proportion (for example, 0.05 to 1 percent) of air, this additional treatment having the effect of eliminating any pyrophoricity of the granules by covering them with a skin of oxide. This antipyrophoric treatment may also be made on the catalysts after pelletizing or, if the pellets are to be utilized immediately, it can be omitted.

The pellets which constitute the catalyst, according to the invention, are porous, homogeneous, geometrically identical, and mechanically very strong. As is shown by observations with the microscope and with the mercury porosimeter, they contain a homogeneous network of macropores of a diameter equal to or greater than 2,000 angstroms, which has a considerable specific volume and is distributed in the microcrystalline mass of $\alpha$-iron constituting the internal active surface of the pellets. This structure permits easy access for the reacting gaseous phase to all points of the inside surface of the catalyst, while the high apparent density and the regularity of shape of the pellets permit a filling of greater weight of the synthesis converter, for an equal volume, without increasing the pressure drop, and the elimination of preferential passages for the current of gas in the charged converter, thus ensuring more effective utilization of the charge during operation and providing increased productivity.

The following examples are given for the purpose of illustrating the invention. They are not, however, to be deemed limitative in any respect.

EXAMPLE I

A crude catalyst was first prepared by very quickly cooling in a thin layer, on a movable, cooled ingot mold, the fusion product of a mixture of oxides of iron of the approximate composition of magnetite and promoters having the following composition:

Amount of $Fe^{II}$ in the total mixture of oxides = 22.36%
$Al_2O_3$ = 1.99%
$K_2O$ = %
$Li_2O$ = %

After being crushed, granulated into particles of about 3 mm., and disposed in a thin layer in a suitable converter, this fusion product was reduced by the synthesis mixture $N_2+3H_2$ which was passed at high space velocity and at an initial temperature of 150° C., the space velocity and the temperature being so regulated that the water vapor content of the gaseous reducing phase did not exceed 0.25 percent. The end of the reduction was carefully checked by gravimetry in order to make sure that it was complete. This was done by means of differential weighings of ascarite tubes traversed by the gaseous phase and retaining quantitatively the water to be determined. The temperature of the mass was then approximately 500° C. The mass was then cooled and treated by the same mixture $N_2+3H_2$, additionally charged with 1 percent of air. The rise in temperature of the mass during this operating did not exceed 30° C., and its termination was marked by a return to ambient temperature.

It was then possible for the mass to be easily ground into a coarse powder, which it was easy to agglomerate into pellets of a diameter of 10 mm. by simple compression at a pressure of 10 tons per cm.$^2$, without any adjuvant, in a conventional pelleting device equipped with a pressure-indicating stabilizer.

The microcrystalline mass essentially made of $\alpha$-iron is pale whereas the net of macropores is dark and homogeneously distributed in the catalyst in the proportion of 45 to 50 percent of the total volume. The pellets obtained as above described were ground and sized to obtain a mesh size of 1 to 2 mm. A layer of 22 cc. of the above-described ground and sized pellets used as catalyst for the synthesis of ammonia in a vertical tubular laboratory reactor of 25 mm. diameter, under different conditions of temperature, pressure and space velocity of the synthesis gas had a reactivity the respective values of which are summarized in Table I below. Reactivity is indicated by the percentage content of $NH_3$ contained in the gas leaving the reactor. The temperatures indicated were taken at the hottest point of the catalyst layer.

TABLE I

| Temperature | Pressure | Space Velocity Vol./vol./hr. | Reactivity % $NH_3$ |
|---|---|---|---|
| 446° C. | 324 bars | 16,000 | 31.2% |
| 446° C. | 324 bars | 28,200 | 28.1% |
| 360° C. | 245 bars | 2,500 | 23.2% |

Table II below compares the physical properties of catalyst pellets according to the invention, having a diameter of 10 mm. and obtained by compression at respective pressures of 3 and 10 tons per pellet (about 3.8 tons/cm.$^2$ and 13 tons/cm.$^2$) with those of fragments obtained by crushing, screening, and sizing the conventional catalyst, which is then reduced under identical conditions to those of the reduction of the catalyst pellets forming the subject of the invention.

TABLE II

| | Fragments | Pellets according to the invention | |
|---|---|---|---|
| Dimensions | 10×6 mm | Diameter 10 mm.; height 6.4 mm. | Diameter 10.2 mm.; height 11.1 mm. |
| Real density | 3.80 | 3.68 | 3.72 |
| Apparent density | 2.02 | 2.25; compression 3 tons/pellet. | 2.29; compression 10 tons/pellet. |
| Macroporosity ≥2,000 A | 0.01 cm.$^3$/g | 0.052 cm.$^3$/g | 0.026 cm.$^3$/g. |
| Mean porosity between 400 A. and 2,000 A. | 0.095 cm.$^3$/g | 0.091 cm.$^3$/g | 0.09 cm.$^3$/g. |
| Microporosity expressed by the BET surface of the pores of a diameter smaller than 400 A. | 18 m.$^2$/g | 17.5 m.$^2$/g | 17.2 m.$^2$/g. |
| Fragility | Fragments crushable by hand without effort. | Very hard, not breaking into fragments when freely dropped onto tiles from a height of 10 meters. | |

TABLE II—Continued

| | Fragments | Pellets according to the invention | |
|---|---|---|---|
| Reactivity measured by the $NH_3$ content in the gas leaving the reactor after synthesis at a space velocity of 16,000 at 446° C. and at 324 bars. | 27% | 31.2% | 31%. |

For the reactivity tests both the fragments and the pellets were ground and sized to obtain a mesh size of 1 to 2 mm. The said tests were conducted in the same manner as those related in Table I and the temperature was that at the hottest point of the catalyst layer.

EXAMPLES II to VI

A series of crude catalysts were first prepared by quickly cooling molten masses of mixtures of oxides with magnetite having the following compositions of promoter oxides as shown in Table III,

TABLE III

| | Promoter oxide content of the crude catalyst | | | | | Total percent of promoter oxides |
|---|---|---|---|---|---|---|
| Examples | $SiO_2$ (percent) | CaO (percent) | MgO (percent) | $Al_2O_3$ (percent) | $K_2O$ (percent) | $SiO_2+CaO$ $MgO + Al_2O_3$ |
| II | 0.19 | 0.22 | 0.54 | 0.50 | 0.48 | 1.45 |
| III | .29 | .31 | .50 | 1.92 | .50 | 3.02 |
| IV | .18 | .18 | .46 | 4.31 | .52 | 5.13 |
| V | .92 | 2.72 | .35 | 3.53 | .51 | 7.52 |
| VI | .27 | .24 | .47 | 8.70 | .45 | 9.68 |

After crushing, the different catalysts in 3 to 8 mm. fragments were subjected to reduction with the mixture $N_2+3H_2$ at a space velocity of 4,000 with a heating program of 5° C. per hour from ambient temperature to 520° C. Reduction was continued at 520° C. for 10 hours.

After cooling to ambient temperature, they were treated with a stream of $N_2+3H_2$ containing 400 p.p.m. of oxygen until their pyrophoricity disappeared.

The prereduced, treated fragments were then crushed into a powder passing through a 1-mm. mesh. This powder was pelletized in a double-action rotary press at a pressure of 5,800 kg./cm.² without addition of any adjuvants.

The pellets of reduced catalyst had a diameter of 5 mm. and a length of 5 mm. They were subjected to identical mechanical tests so as to show the correlation between the total proportion of refractory promoters and the mechanical properties.

Resistance to shearing was measured on the middle portion of the pellet (the most fragile portion) by means of a balance, one arm of which is provided with a shearing knife, the shearing force being applied on the other arm.

The abrasion rate (percent of dust) was obtained by rolling the pellets in cylinders (in the direction of the generatrices) of a device specially made for this purpose.

The test lasted for 1 hour at a speed of 10 r.p.m.

This test is very stiff with respect to the abrasion which pellets undergo both during transport and in the reactor. Table IV gives the results of these mechanical tests.

TABLE IV

| | Total % of Promoter Oxides $SiO_2+CaO+$ $MgO+Al_2O_3$ | Mechanical Properties | |
|---|---|---|---|
| Example | | Shear kg./cm.² | Abrasion % dust |
| II | 1.45 | 9.8 | 0.60 |
| III | 3.02 | 9.5 | 0.78 |
| IV | 5.13 | 8.7 | 1.10 |
| V | 7.52 | 7.3 | 1.33 |
| VI | 9.68 | 5.7 | 1.60 |

This table demonstrates that the mechanical strength of the pellets is great, even where the total amount of refractory oxides is lowest. As a comparison, conventional 3 to 8 mm. fragments of a catalyst composition identical to that of Example III, reduced but not pelletized gave 12.5 percent of dust when subjected to the same abrasion test. This size fragment is ordinarily utilized in industrial reactors.

Furthermore, industrial experience with several reactors of various types, has shown that the pellets having an abrasion rate (measured in the apparatus mentioned) lower than 6 percent, had sufficient mechanical properties to resist erosion by gas under pressure.

The macropore volume for the catalyst composition of Example III was determined before and after pelletizing at a pressure of 5,800 kg./cm.². The 3 to 8 mm. fragments of the prereduced catalyst were compared with the same material after grinding to a powder passing through a 1-mm. mesh and pelletizing and the results are given in Table V.

TABLE V

| | Porosity in mm.³/g. | |
|---|---|---|
| Size of Pores in A | $10^3$ to $10^4$ | $10^4$ to $7.5×10^4$ |
| Prereduced fragments size 3 to 8 mm. (apparent density 3.8) | 4.7 | 3 |
| Prereduced pellets dia. = 5 mm., l=5 mm. (apparent density 4.1) | 21.1 | 11.7 |

The porosity of pellets between 1,000 and 75,000 A. is therefore 4.2 times greater than that of fragments from which the powder, which was pelletized, was obtained.

As a further comparison, the catalyst composition of Example III was further treated in various manners as follows:

a. The 3 to 8 mm. fragments in the nonreduced state were ground and sized to obtain a mesh size of 0.4 to 0.5 mm.

b. The 3 to 8 mm. fragments in the nonreduced state were reduced, ground and pelletized according to the invention. Thereafter, the pellets were ground and sized to obtain 1. a mesh size of 0.4 to 0.5 mm.
   2. a mesh size of 2 to 3.1 mm.

c. The 3 to 8 mm. fragments in the nonreduced state were reduced, ground and sized to obtain a mesh size of 2 to 3.1 mm.

d. The 3 to 8 mm. fragments in the nonreduced state were finely ground to powder. From said powder one-third passing a 20-mesh sieve and two-thirds passing a 100-mesh sieve were thoroughly mixed. This mixed powder was pelletized. The unreduced pellets were sintered at about 1,120° C. for several hours giving a pellet of good mechanical strength. These sintered, unreduced pellets of catalyst were then ground and sized to a mesh size of 0.4 to 0.5 mm.

As indicated above, before being charged in the ammonia synthesis reactor of Example I (laboratory reactor) the precatalyst or catalyst, according to the case, whether just crushed after fusing, pelletized according to the invention or sintered, was physically reduced to particles having a grain-size of:

1. 0.4 to 0.5 mm. in order to eliminate the limitations due to gaseous diffusion. (Recent experiments reported by Nielsen in Journal of Catalysis, Vol. 3, Feb. 1964 show that such limitations are avoided with grains smaller than 0.7 mm.) The space velocity of the $N_2+3H_2$ mixture in the reactor was 25,000 vol. gas per vol. catalyst per hour.

2. 2 to 3.1 mm. in order to take into account the said gaseous diffusion phenomenon and evaluate the utility of the macropores obtained by pelletizing. The space velocity was 12,000.

The results of these comparative tests are given in Table VI. In each instance the catalyst charged was thoroughly reduced before the activity was measured under comparable conditions.

TABLE VI

| Treatment of the catalyst of Example III | Grain size, mm. | Volume of catalyst, cm.$^3$ | Space velocity | Activity of the catalyst—percent by weight of $NH_3$ at various temperatures—synthesis pressure 250 bars | | | | |
|---|---|---|---|---|---|---|---|---|
| | | | | 400° C. | 420° C. | 440° C. | 460° C. | 480° C. |
| A—Crude | 0.4–0.5 | 2.5 | 25,000 | 17 | 19.4 | 21 | 21.8 | 21.7 |
| P$_1$—Reduced-pelletized | 0.4–0.5 | 2.5 | 25,000 | 16.9 | 19.6 | 21.2 | 22.1 | 22 |
| D—Unreduced-sintered | 0.4–0.5 | 2.5 | 25,000 | 10.5 | 13.1 | 15.4 | 17.3 | 18.3 |
| C—Reduced-unpelletized | 2–3.1 | 5 | 12,000 | 12.1 | 13.8 | 15.4 | 16.7 | 17.8 |
| B$_2$—Reduced-pelletized | 2–3.1 | 5 | 12,000 | 15 | 17 | 18.6 | 20 | 20.6 |

In all cases where the precatalyst was reduced in a separate apparatus, the reduced catalyst was stabilized by antipyrophoretic treatment with oxygen.

These results show that the activity of the catalyst undergoes no change when it is prereduced and pelletized according to the invention (A vs. B$_1$) but that sintering of the crude catalyst leads to a loss of activity (A vs. D). pelletizing according to the invention is favorable in the commercial reactors which require larger-sized catalysts since the production ratio is higher with the 2–3.1-mm. grains obtained from the prereduced pellets than from the same-sized grains obtained from prereduced but unpelletized catalyst (C vs. B$_2$).

EXAMPLE VII

An oxide composition identical to that of Example III was fused, crushed and reduced under the same conditions as Example III. However, the treatment to reduce the pyrophoricity was not performed. The prereduced fragments were then crushed into a powder passing through a 1-mm. mesh under an atmosphere of nitrogen. This powder was pelletized on a rotary press at a pressure of 5,800 kg./cm.$^2$ under an atmosphere of nitrogen. The pellets were subjected to the mechanical property tests described above. The shearing pressure of the pellets was 13.4 kg./cm.$^2$ and the percent of dust in the abrasion test was 0.19 percent. Comparing these results with those of Example III in Table IV, it can be seen that the pelletizing of the reduced material which has not undergone an antipyrophoritic treatment gives a pellet with even better mechanical properties. The resistance to shearing is improved by about 40 percent and the abrasion resistance is four times greater (one-fourth the percent of dust).

The preceding specific embodiments are illustrative of the practice of the invention. It is to be understood, however, that other expedients known to those skilled in the art may be employed without departing from the spirit of the invention.

We claim:

1. A method of preparing iron-promoted catalyst in a pelletized form for the synthesis of ammonia which consists of the consecutive steps of (1) fusing a mixture consisting essentially of iron oxides of the approximate composition of magnetite, together with additional oxides of promoter metals in a total proportion of the oxides of promoter metals of from about 1 percent to about 10 percent, said oxides of promoter metals consisting in part of alumina in an amount of from 0.5 to 9 percent and alkali metal oxides in an amount of from 0.075 to 2 percent, (2) rapidly cooling the fusion product, (3) grinding the fusion product to obtain fine regular granules of a particle size of about 2 to 10 mm., (4) reducing substantially the fused granules, (5) grinding the reduced fused granules to a particle size not exceeding 2 mm., (6) agglomerating the reduced ground product into pellets by simple compression at a pressure of from 3 to 15 tons per cm.$^2$, and (7) recovering said iron-promoted catalysts in a pelletized form.

2. The method of claim 1 wherein said additional oxides of promoter metals are selected from the group consisting of alumina, silica, the alkali metals and earth-alkali metals oxides.

3. The method of claim 1 wherein said additional oxides of promoter metals include from 0.5 to 9 percent alumina and from 0.075 to 2 percent of $K_2O$.

4. The method of claim 1 wherein said additional oxides of promoter metals include from 1 to 2.5 percent alumina and from 0.1 to 0.5 percent of $K_2$).

5. The method of claim 1 wherein said additional oxides of promoter metals consist of from 1 to 2.5 percent of alumina, from 0.1 to 0.5 percent of $K_2O$ and from 0.1 to 0.5 percent of $Li_2O$.

6. The method of claim 1, wherein after step 4, said reduced granules after cooling are subjected to an antipyrophoric treatment.

7. The method of claim 1, wherein after step 6, said pellets are subjected to an antipyrophoric treatment.

* * * * *